(12) United States Patent
Le Brech et al.

(10) Patent No.: US 7,465,685 B2
(45) Date of Patent: Dec. 16, 2008

(54) HEATSEALABLE FILTER MATERIAL

(75) Inventors: Yves Le Brech, Scaer (FR); Günter Heinrich, Gernsbach (DE); Manfred Kaußen, Ottersweier (DE); Stefan Kuntz, Baden-Baden (DE); Danny Meger, Gernsbach (DE)

(73) Assignee: Glatfelter Gernsbach GmbH & Co. KG, Gernsbach (DE)

( * ) Notice: Subject to any disclaimer, the term of this patent is extended or adjusted under 35 U.S.C. 154(b) by 0 days.

(21) Appl. No.: 10/618,109

(22) Filed: Jul. 11, 2003

(65) Prior Publication Data

US 2004/0129632 A1    Jul. 8, 2004

(30) Foreign Application Priority Data

Jul. 11, 2002   (DE) ................ 102 31 403

(51) Int. Cl.
*B32B 5/26* (2006.01)
*D04H 1/46* (2006.01)

(52) U.S. Cl. .............. 442/381; 442/390; 442/407; 442/400; 428/219

(58) Field of Classification Search ............ 442/381, 442/389, 415, 416, 390, 407, 400; 428/297.1, 428/424.8
See application file for complete search history.

(56) References Cited

U.S. PATENT DOCUMENTS

| | | | |
|---|---|---|---|
| 4,826,945 A | 5/1989 | Cohn et al. | |
| 5,021,510 A | 6/1991 | Vroomans | |
| 5,082,899 A * | 1/1992 | Sawyer et al. | 525/74 |
| 5,173,154 A | 12/1992 | Heinrich | |
| 5,227,229 A | 7/1993 | McCoy et al. | |
| 6,228,948 B1 * | 5/2001 | Flaris et al. | 525/285 |
| 6,506,873 B1 | 1/2003 | Ryan et al. | |
| 6,706,086 B2 | 3/2004 | Emig et al. | |
| 2003/0019598 A1 * | 1/2003 | Nakagawa et al. | 162/123 |
| 2003/0207639 A1 * | 11/2003 | Lin | 442/361 |
| 2004/0013831 A1 | 1/2004 | Whittaker et al. | |
| 2004/0018795 A1 | 1/2004 | Viazmensky et al. | |

FOREIGN PATENT DOCUMENTS

| | | |
|---|---|---|
| CA | 2 289 739 A1 | 11/1998 |
| DE | 2147321 | 3/1972 |
| DE | 3831709 | 3/1990 |
| DE | 39 02 298 C1 | 8/1990 |
| DE | 19719807 | 11/1998 |
| DE | 10206924 | 9/2003 |
| DE | 10206926 | 9/2003 |
| DE | 10231403 | 2/2004 |
| EP | 0380127 | 8/1990 |
| EP | 0641817 | 3/1995 |
| EP | 0656224 | 6/1995 |
| EP | 1266997 | 12/2002 |
| FR | 2 663 350 | 12/1991 |
| JP | 2001131826 | 5/2001 |
| WO | WO 9923306 * | 5/1999 |

* cited by examiner

*Primary Examiner*—Lynda Salvatore
(74) *Attorney, Agent, or Firm*—RatnerPrestia

(57) ABSTRACT

A filter material comprising at least one nonheatsealable ply and at least one heatsealable ply which comprises fibers of synthetic material and contains an adhesion promoter, and also processes for producing same.

7 Claims, 3 Drawing Sheets a)

b)

c)

HEATSEALABLE FILTER MATERIAL

PRIORITY TO FOREIGN APPLICATIONS

This application claims priority to German Patent Application Serial No. 102 31 403.9, entitled "HEATSEALABLE FILTER MATERIAL", filed Jul. 11, 2002.

FIELD OF THE INVENTION

The present invention relates to a heatsealable filter material having excellent seal seam strength after heatsealing in the dry and in the wet state, comprising at least one nonheatsealable ply of fiber material and a heatsealable second ply which is composed of synthetic material and contains an adhesion promoter.

BACKGROUND OF THE INVENTION

It is known to pack tea or other goods into bags which are brewed up with hot water for use. The second ply of heatsealable synthetic material/heatsealable synthetic fibers serves to close the bag by heatsealing on high-speed packing machines. As synthetic material/synthetic fibers it is possible to use, for example, polypropylene, polyethylene, interpolymers of polyvinyl chloride and vinyl acetate and also various polyesters.

These bag materials can be produced in known manner by a wet-laid process on a paper machine, by a dry-laid process on a webbing machine or by a melt-blown process by laydown of polymeric fibers on a support layer.

The basis weight of the first ply of material is generally in the range of 8-40 $g/m^2$ and preferably in the range of 10-20 $g/m^2$, and the basis weight of the second polymeric fibrous ply is in the range of 1-15 $g/m^2$ and preferably in the range of 1.5-10 $g/m^2$.

EP-A-0 380 127 describes a heatsealable paper for tea bags which has a basis weight of 10-15 $g/m^2$ and which for heatsealing has been provided with polymers such as polypropylene and/or polyethylene and/or an inter-polymer of vinyl chloride and vinyl acetate.

EP-A-0 656 224 describes a filter material especially for producing tea bags and coffee bags or filters having a basis weight between 8 and 40 $g/m^2$, wherein the heatsealable ply consists of polymeric fibers, preferably of polypropylene or polyethylene, which is laid down in the hot state onto the first ply, which consists of natural fibers.

Prior art heatsealable filter materials have the disadvantage that the seal seams formed by heatsealing are not strong enough for a multiplicity of applications. In some instances, they reopen while still on the packing machine or else later on contact with boiling water. One reason for this is that the production of filled, heatsealed tea bags on high-speed packing machines occurs at a cycle time of about 1,000 bags per minute.

Heatsealing rolls generally seal the bag at a temperature of 150-230° C. in a cycle time of less than 0.1 second. At the end of these short cycle times, the executed seal seams have to be firmly closed in order that no contents may escape. This is frequently not the case, however.

Another reason for the inadequate strength of seal seams is frequently that the shape of tea bags is adapted to consumer demands, and at present it is a round embodiment which is attracting more and more interest. This round tea bag has for the same fill level a seal seam width which is roughly half that of the conventional rectangular bag, increasing the risk of opening.

Attempts to increase seal seam strength by increasing the fraction of available heatseal fibers to above 50% based on the total basis weight of the filter material, occasion a reduction in mechanical properties, such as filter material strength and stiffness. Furthermore, increasing the fraction of heatsealable polymeric fibers increases the barrier properties of the filter material, leading to a distinct reduction in tea 5 extraction. Since these properties, however, are necessary for a smooth packing operation, this approach does not lead to a filter material having excellent heatsealability and good seal seam strength in the dry and in the wet state.

It is an object of the present invention to provide a filter material having excellent heatsealability and good seal seam strength in the dry and in the wet state that overcomes the aforementioned disadvantages of the prior art.

It is another object of the present invention to provide a process for producing such filter materials.

SUMMARY OF THE INVENTION

It has now been found that, surprisingly, employing an adhesion promoter provides heatsealable filter materials which provide excellent properties with regard to heatsealability and seal seam strength.

In accordance with one embodiment of the present invention, the filter material of the present invention comprises at least one first, nonheatsealable ply and at least one second, heatsealable ply which comprises fibers of synthetic material and which contains an adhesion promoter.

The employment of an adhesion promoter in the heatsealable ply comprising fibers of synthetic material confers on the filter material according to the present invention the property that heatseal seams formed from the filter material according to the present invention (as described herein) by means of suitable apparatus are highly stable to hot water.

BRIEF DESCRIPTION OF THE DRAWINGS

The present invention and its presently preferred embodiments will be better understood by way of reference to the detailed disclosure herebelow and to the accompanying drawings, wherein:

FIG. 1(a) depicts the formation of a first fibrous layer consisting of natural fibers 1 and the formation of a second fibrous layer comprising synthetic heatsealable fibers 2.

FIG. 1(b) shows how the dewatering of the two layers achieves a partial interpenetration of the two layers, so that the synthetic fibers 2 end up between the natural fibers 1.

FIG. 1(c) shows the filter material once rendered heatsealable following the drying and subsequent heating of the mutually partially interpenetrating layers 1 and causing the synthetic fibers 2 to melt and, on resolidifying, surround and partially encasing the fibers 1.

DETAILED DESCRIPTION OF THE PREFERRED EMBODIMENTS

Figure 1:
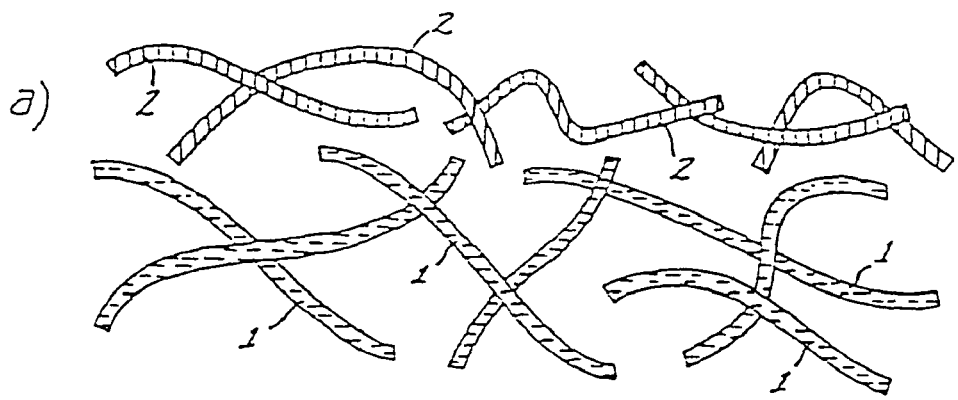
FIG. 1 is a schematic diagram illustrating the formation of the filter material according to the present invention in a schematic diagram.
Figure 1:
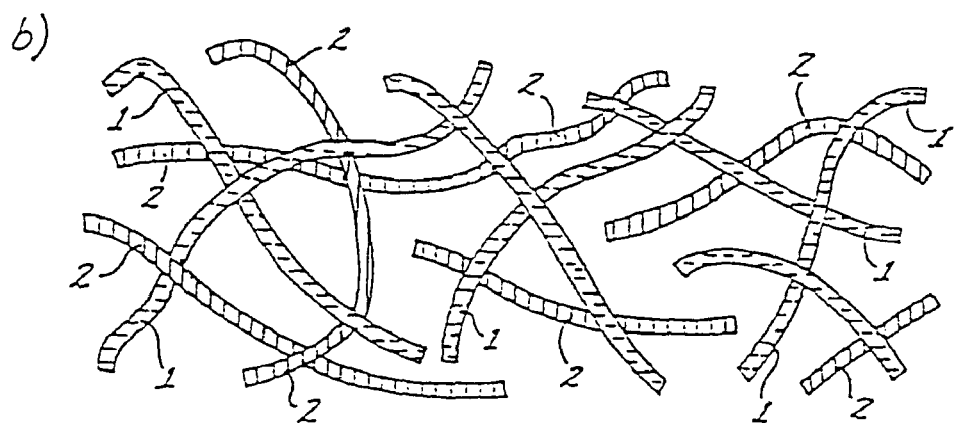
Figure 1:
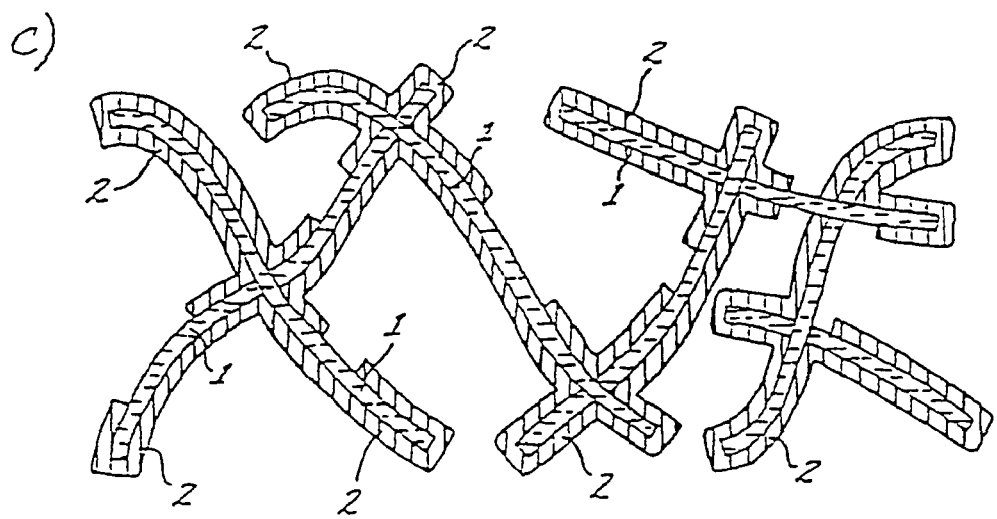

As used herein, "stable to hot water" for the purposes of the present invention is to be understood as meaning that a heatseal seam of a filter bag produced from the filter material according to the present invention will still be intact after a 4-minute brewing operation.

In a preferred embodiment, the filter material according to the present invention may be heatsealed by ultrasound treatment.

Without wishing to be bound by any one theory, the inventors of the present invention believe that, owing to the employment of an adhesion promoter, the heatsealable fibers being laid down on the at least one first ply enter not only adhesive bonds, but additionally chemical bonds with the fiber material of the at least one first, nonheatsealable ply. This leads to strength enhancement and excellent properties for the resultant filter material with regard to heatsealability and seal seam strength.

Preferred adhesion promoters for use according to the present invention are modified polyolefins (such as in particular polyethylene, polypropylene, ethylene-propylene copolymers, ethylene-a-olefin copolymers or ethylene-vinyl acetate copolymers) which have been grafted with at least one monomer from the group of the $\alpha,\beta$-singly unsaturated dicarboxylic acids, such as in particular maleic acid, fumaric acid, itaconic acid or their anhydrides, esters, amides and imides. Useful adhesion promoters further include copolymers of ethylene with $\alpha,\beta$-singly unsaturated carboxylic acids, such as acrylic acid, methacrylic acid and/or their metal salts with zinc or sodium and/or their alkyl (C1-C4) esters, which may likewise be grafted with at least one monomer from the group of the $\alpha,\beta$-singly unsaturated dicarboxylic acids, such as in particular maleic acid, fumaric acid, itaconic acid or their anhydrides, esters, amides and imides. Useful adhesion promoters further include polyolefins (such as in particular polyethylene, polypropylene, ethylene-propylene copolymers or ethylene-a-olefin copolymers) which have been grafted with copolymers of ethylene with $\alpha,\beta$-singly unsaturated carboxylic acids, such as acrylic acid, methacrylic acid and/or their metal salts with zinc or sodium and/or their alkyl (C1-C4) esters. Particularly useful adhesion promoters for the purposes of the present invention are polyolefins (especially 10 ethylene-a-olefin copolymers) grafted with $\alpha,\beta$-singly unsaturated dicarboxylic anhydride, especially maleic anhydride.

The adhesion promoters used according to the present invention preferably contain from about 0.1 to about 5%, and especially from about 0.2 to about 2% by weight of free functional $\alpha,\beta$-singly unsaturated dicarboxylic acid groups, such as, for example, maleic anhydride groups.

The amount in which the adhesion promoter is present in the filter material according to the present invention is typically in the range of from about 2 to about 25% by weight, preferably in the range of from about 5 to about 20% by weight and more preferably in the range of from about 5 to about 15% by weight, based on the weight of the at least one second, heatsealable ply comprising fibers of synthetic material.

In one embodiment of the present invention, the starting materials for the at least one second, heatsealable ply comprising fibers of synthetic material may be fibers from natural or synthetic fibers and biodegradable thermoplastic polymers as described for example in DE 197 19 807 A1 or DE 102 06 926 A1.

In a further embodiment of the present invention, the starting materials for the at least one second, heatsealable ply comprising fibers of synthetic material may be fibers from natural or synthetic fibers and apolar hydrophobic polymers from polyolefin, for example, such as polypropylene or polyethylene or mixtures thereof, vinyl chloride-vinyl acetate copolymers or polyesters.

The filter materials according to the present invention, as well as the at least one second, heatsealable ply comprising fibers of synthetic material, contain at least one ply of fiber material which is preferably natural fibers and/or cellulose derivative fibers.

The proportion of the filter material which is accounted for by these natural fibers and/or cellulose derivative fibers is typically in the range of from about 50 to about 99.95% by weight, based on the paper weight of the ready-produced filter material, more preferably in the range of from about 65 to about 99.9% by weight and most preferably in the range of from about 80 to about 99.5% by weight of the filter material.

Useful natural fibers for the purposes of the present invention include natural fibers known to one skilled in the art, such as hemp, manila, jute, sisal and others, and also long fiber wood pulp.

Useful cellulose derivative fibers for the purposes of the present invention may be fibers composed of regenerated cellulose.

An embodiment of the filter material according to the present invention and their production will now be more particularly described.

In general, the filter materials according to the present invention, as well as the fibers composed of a heatsealable material and the adhesion promoter, comprise at least one further component which comprises or preferably consists of natural fibers.

In this preferred embodiment of the present invention, the filter material according to the present invention is thus produced from two or more plies of different components, at least one ply containing natural fibers and one ply a blend of fibers of a heatsealable material and adhesion promoter, such that the at least two plies are able to partly interpenetrate each other after production of the filter material. The degree of interpenetration of the plies can be controlled through the production process of the filter material such as, for example, by controlling the degree of dewatering on the screen in the case of a paper machine being used.

In the case of the filter material according to the present invention being produced on a paper machine, the second ply typically comprises a blend of natural fibers, fibers of a synthetic material and adhesion promoter. This blend can be laid down on the first ply of natural fibers on the paper machine and so be fused with each other as well as with the paper ply.

In the case of the filter material according to the present invention being produced by a melt-blown process, the second ply typically comprises a fiber blend of synthetic material and adhesion promoter. This fiber blend may be melt-blown onto the first ply of natural fibers and so be fused with each other as well as with the paper ply.

The first ply of the filter material has a basis weight which is generally between about 8 and about 40 g/m$^2$ and preferably in the range of from about 10 to about 20 g/m$^2$ and a DIN ISO 9237 air permeability in the range of from about 300 to about 4000 l/m$^2$ s and preferably in the range of from about 500 to about 3000 l/m$^2$ s.

The second ply of the filter material has a basis weight which is generally between about 1 and about 15 g/m$^2$ and preferably in the range of from about 1.5 to about 10 g/m$^2$.

The first ply of the filter material (comprising or preferably consisting of natural fibers and/or regenerated cellulose fibers) is preferably constructed to have wet strength.

The first ply (comprising or preferably consisting of natural fibers and/or regenerated cellulose fibers) according to the present invention utilizes typically known natural fibers, such as hemp, manila, jute, sisal and other long fiber wood pulps and also preferably mixtures thereof and/or regenerated cellulose fibers.

The at least one second, heatsealable ply may contain or consist of fibers composed of a heatsealable material and adhesion romoter. The second ply, especially in the case of the filter material according to the present invention being produced on a paper machine, preferably, as well as the above constituents, comprises a further constituent, especially natural fibers, and mixing ratios of 1/3 natural fibers and 2/3 heatsealable polymeric fibers are particularly preferred.

The filter material according to the present invention may be used, for example, for producing tea bags, coffee bags or tea or coffee filters.

As observed above, the process for producing the filter materials according to the present invention can be controlled in such a way that the heatsealable fibers of the second ply partially interpenetrate the first ply and thus encase the fibers of the first ply, preferably the natural fibers of the first ply, in the molten state in the course of the drying operation on the paper machine, for example. However, according to the present invention, the necessary pores for filtration are left unblocked.

A production process which may be used according to the present invention will now be more particularly described by way of example for a two-ply filter material with reference to the drawings, where FIG. 1 illustrates the various stages in the formation of the inventive filter material from natural fibers and synthetic fibers for the example of the use of a paper machine in a general, broadly schematic diagram.

FIG. 1 illustrates the formation of the filter material according to the present invention in a schematic diagram. FIG. 1(a) depicts the formation of a first fibrous layer consisting of natural fibers 1 and the formation of a second fibrous layer comprising synthetic heatsealable fibers 2. The formation of the second layer comprising the fibers 2 thus takes place by laydown atop the first layer, which is formed by the natural fibers 1. To distinguish them in the drawing, the natural fibers 1 are shown with horizontal hatching and the heatsealable fibers 2 with approximately vertical hatching.

FIG. 1(b) shows how the described dewatering of the two layers, especially of the second layer comprising the fibers 2, achieves a partial interpenetration of the two layers, so that the synthetic fibers 2 end up between the natural fibers 1.

In a further production step, the mutually partially interpenetrating layers 1 and 2 are dried and in the course of drying heated such that the synthetic fibers 2 melt and, on resolidifying, come to surround the fibers 1 such that these are at least partially encased. The filter material has thus been rendered heatsealable (FIG. 1(c)).

Figure 2:
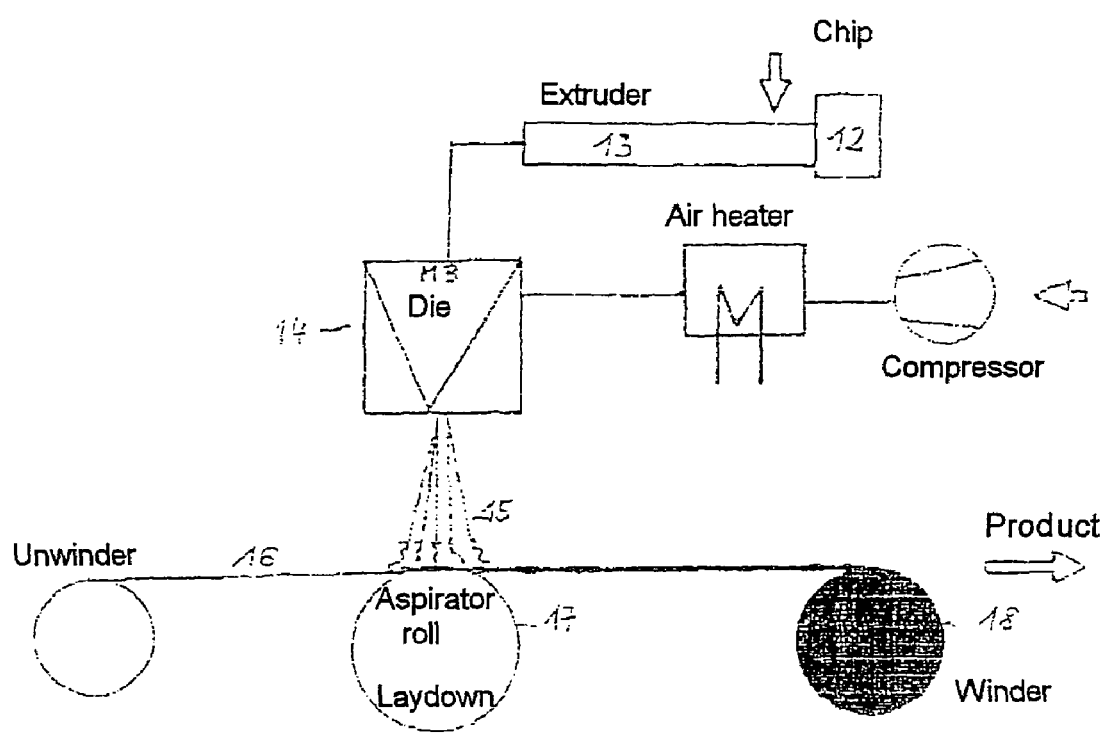
FIG. 2 shows the fundamental construction of a paper machine as can be used for producing a filter material according to the present invention.

FIG. 2 shows the fundamental construction of a paper machine as can be used for producing a filter material according to the present invention. First, a suspension "A" is formed from the ground natural fibers and water. In addition, a suspension "B" is prepared with the blend of fibers of a heatsealable material and adhesion promoter and optionally other fibers such as, for example, natural fibers, and also water.

These two suspensions A and B are fed from the respective vessels (3 and 4) via the head box to the paper machine. It possesses essentially a circulating screen (5) which travels across a number of dewatering chambers (6, 7 and 8).

Suitable piping and pumping means (not depicted) are used to pass the suspension A onto the screen 5 above the first two dewatering chambers 6, the water being sucked away through the chambers 6 and the dewatering line. In the process, a first layer of the natural fibers 1 is formed on the moving screen 5. As the screen 5 continues to travel across the dewatering chambers 7 the second suspension B is supplied, and the second layer of synthetic fibers is laid down on top of the first layer above the dewatering chambers 7. In the process, dewatering takes place through the dewatering line. In the course of the further movement of the screen 5 bearing the two superposed fibrous layers, a dewatering operation is conducted above the dewatering chambers 8, as a result of which the two layers come to partially interpenetrate each other. The degree of interpenetration can be varied through appropriate adjustment of the degree of dewatering.

The resultant formed material 9, composed of natural fibers and polymeric fibers, is then taken off the screen and sent to a drying operation. This drying operation can be effected in various ways such as, for example, by contact drying or flowthrough drying.

The elements 10 are merely a rough diagrammatic suggestion of appropriate drying elements.

FIG. 2 by reference numeral 10 identifies three drying cylinders, via which the formed paper web is contact dried. However, it is also practicable to lead the resultant paper web over one cylinder only and to dry it with hot air without the web resting on this cylinder.

The heating of the two-ply fibrous material causes the synthetic fibers 2 in the mixed layer 9 to melt. As they resolidify at the exit from the drying station, the synthetic fibers come to at least partially encase the natural fibers and the heatsealable filter material is wound up on a roll 11.

It has been determined according to the present invention that, surprisingly, the seam seal strength of the filter material according to the present invention can be further improved by heat treatment.

In one embodiment according to the present invention, the heat treatment can take place in the course of an additional heat treatment after the filter material has been ready produced.

This additional heat treatment is advantageously carried out at temperatures in the range of from about 150 to about 200° C. and preferably in the range of from about 150 to about 175° C. Such a heat treatment is carried out for a time which is typically in the range from 1 to 10 minutes and preferably in the range from 2 to 5 minutes.

However, it is also possible according to the present invention for the seal seam strength of the filter material according to the present invention to be improved by increasing the temperature in the drying station (such as, for example, the drying cylinder or the flowthrough dryer) in the course of production on a paper machine.

The filter material according to the present invention may further be produced by a melt-blown process as will now be described for a two-ply filter material.

When the mixture of polymer and adhesion promoter that forms the second ply is in the form of chips, it may be melt-blown into fibers which are laid down, while still hot and tacky, on a substrate such as, for example, a paper composed of natural fibers.

Figure 3:
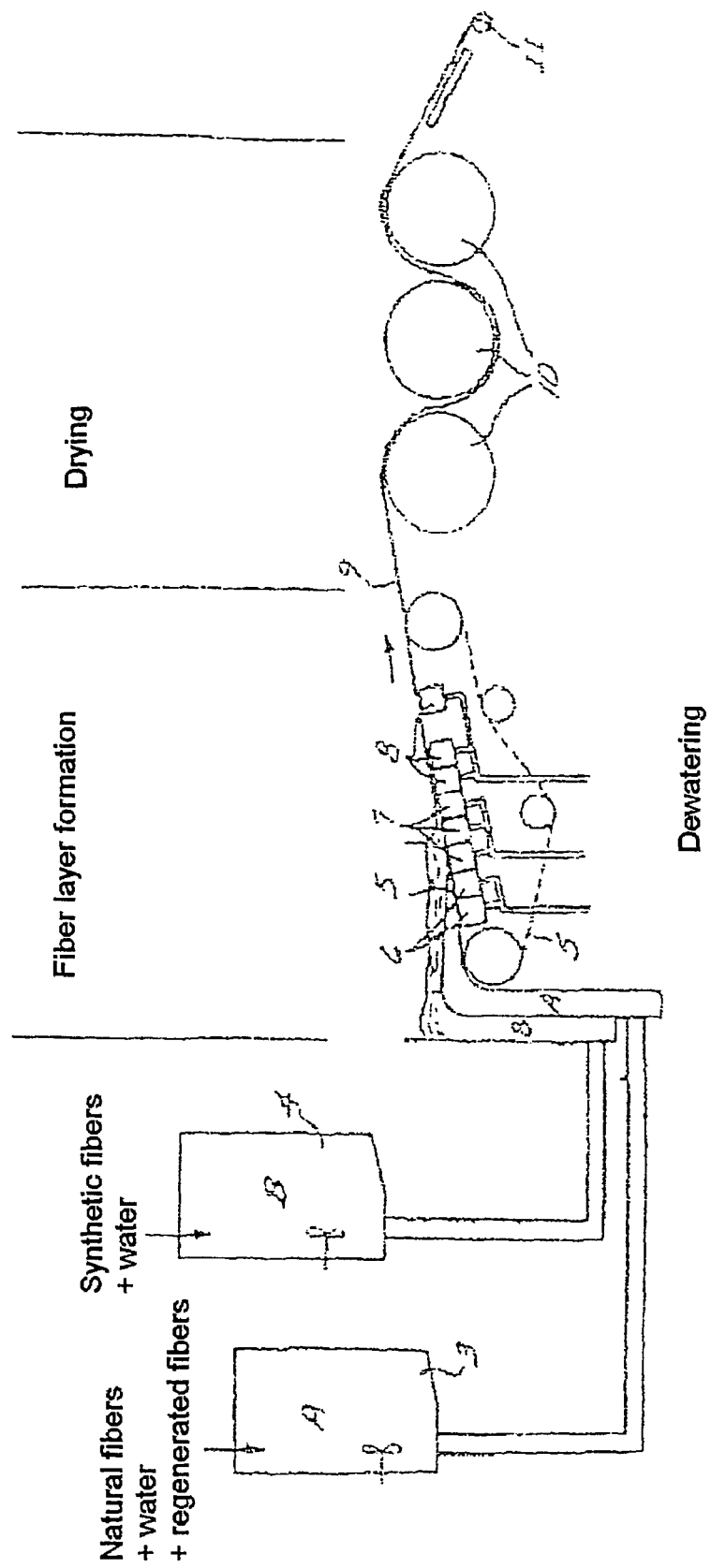
FIG. 3 is a schematic representation of the melt blown process.

This operation forms part of the prior art (see for example EP-A-0 656 224 and DE-A-197 19 807), but the fundamentals of the process depicted in FIG. 3 will now be briefly discussed nonetheless.

The dried chip 12 is transported into an extruder 13, where it is melted and heated to the temperature needed for fiber formation. This molten and heated mixture then arrives at the MB die 14. This die has a large number of small openings through which the molten polymer mixture is pressed and pulled to form fibers. These fibers 15 emerge directly under this die into a high-velocity air stream which further attenuates them and breaks them up into different lengths and are laid down on a collecting surface such as, for example, on a paper of natural fibers 16 which rests on an aspirator roll 17. Since these fibers are still in the hot/tacky state, they adhere to the natural fibers of the paper. The material is then wound up in the cooled state on the winder 18. The typical diameters of these melt-blown fibers are between about 2 and about 7 μm. FIG. 3 is a schematic representation of the melt blown process.

The present invention will now be more particularly described with reference to examples. It will be appreciated that these examples do not restrict the present invention in any way.

EXAMPLE 1

A commercially available polypropylene (PP) chip (Borealis 400, from Borealis, France) was mixed with 5% of a commercially available polypropylene containing 0.5% of functional maleic anhydride groups (Polybond 3150, from Velox, Germany).

The starting materials were melt blown as generally described above to form fibers which were laid down while still hot and tacky onto a web of natural fibers.

The typical diameters of the melt-blown fibers obtained were between 2 and 7 μm.

Results:
1. 95% of PP fibers and 5% of polypropylene containing 0.5% of maleic anhydride groups.
   Web 17.0 g/m$^2$ (with 3.5 g/m$^2$ polymer and 13.5 g/m$^2$ natural fiber)
   Seal Seam Strength:
   longitudinal direction=2.60 N/15 mm
   transverse direction=2.08 N/15 mm
2. 100% of PP fibers
   Web 17.0 g/m$^2$ (with 3.5 g/m$^2$ PP and 13.5 g/m$^2$ natural fiber)
   Seal Seam Strength:
   longitudinal direction=1.48 N/15 mm
   transverse direction=1.32 N/15 mm Method for Measuring Seal Seam Strength (After Brugger):

Two 15 mm wide strips are sealed with the polymer heat-seal layer face to face using the following parameters:
temperature: 210° C.; time: 0.5 sec; pressure: 36.2 psi.

A commercially available INSTRON instrument was then used to determine the force per 15 mm strip width needed to break the seal seam at an extension rate of 20 mm per min.

EXAMPLE 2

A pilot plant equipped with an inclined wire to produce filter papers was used to produce as generally described above an 18 g/m$^2$ heatsealable filter material containing PP fibers and a polypropylene adhesion promoter having maleic anhydride groups (with 1% maleic anhydride).

The comparison is a likewise 18 g/m$^2$ heatsealable filter material containing commercially available PP fibers only.

Description of Pilot Plant:

The plant has 2 head boxes, one for the natural fiber ply and one for the heatsealing polymeric ply. The 2-ply filter material is formed on an inclined wire, dewatered and subsequently dried on a drying cylinder at 150-170° C. and then wound up.

The machine speed is 5 m/min for a paper width of about 40 cm.

Results for Sample 1:
1. Heatseal layer: 93% of PP fibers and 7% of the above adhesion promoter with 1% of maleic anhydride groups corresponds to 4.4 g/m$^2$.
   Softwood pulp: 1.6 g/m$^2$ Total 6 g/m$^2$
2. Base layer 8.3 g/m$^2$ of softwood pulp and 3.7 g/m$^2$ of regenerated cellulose fiber. Total 12 g/m$^2$
   Total weight of filter material: 18 g/m$^2$
   Seal Seam Strength:
   longitudinal direction: 2.51 N/15 mm Results for Sample 2:
1. Heatseal layer: 100% of PP fibers commercially available corresponds to 4.4 g/m$^2$ (fiber linear density: 2.2 dtex/fiber length 2.2 mm)
   Softwood pulp: 1.6 g/m$^2$ Total 6 g/m$^2$
2. Base layer: fibers as above
   Seal Seam Strength:
   longitudinal direction: 1.97 N/15 mm Both the samples of the filter material have wet strength.

The seal seam strength of these samples was determined using an RDM instrument.

Method for Measuring Seal Seam Strength (After RDM):

Two 15 mm wide strips are sealed with the polymer heat-seal layer face to face using the following parameters:
temperature: 210° C.; time: 0.5 sec; pressure: 43.5 psi.

A commercially available INSTRON instrument was then used to determine the force per 15 mm strip width needed to break the seal seam at an extension rate of 20 mm per min.

EXAMPLE 3

The filter material containing 93% of PP fibers and 7% of the above adhesion promoter containing 1% of maleic anhydride groups (sample 1) and also the filter material containing the commercially available 100% PP fibers (sample 2) were, after their production, subjected to an additional heat treatment at a temperature of 150° C. and 175° C. in a drying oven.

Duration: 5 min.

Thereafter, the seal seam strength was measured again, by the method described above.

Results:
Sample 1:
   150° C./5 min: 3.46 N/15 mm
   175° C./5 min: 3.95 N/15 mm
Sample 2:
   150° C./5 min: 2.23 N/15 mm
   175° C./5 min: 2.32 N/15 mm It was found that, surprisingly, sample 1, which contains added adhesion promoter, experiences a higher increase in the seal seam strength than sample 2 without added adhesion promoter, which remains approximately unchanged within the margin of error.

This suggests that an additional heat treatment in the course of the traditional paper production process is a way to improve the seal seam strength of the web according to the present invention.

EXAMPLE 4

Filter materials were produced as described above on a suitable paper machine.

Results:
Sample 1
   Heatseal layer:
      33.3% of PP fibers with 7% of the above adhesion promoter containing 1% of maleic anhydride groups 33.6% of synthetic pulp from PP
33.1% of softwood fibers
corresponds to: 7.4 g/m$^2$
Base layer:
63.6% of softwood fibers
36.4% of regenerated cellulose fibers
corresponds to: 9.0 g/m$^2$ Total weight of sample 1: 16.4 g/m$^2$
Seal Seam Strength in Longitudinal Direction:
2.2 N/15 mm
Seal Seam Strength in Transverse Direction:
1.8 N/15 mm
Sample 2
Heatseal layer:
33.3% of commercial 2.2 dtex/4.6 mm PP fibers
33.6% of synthetic pulp from PP
33.1% of softwood fibers
corresponds to: 7.4 g/m$^2$
Base layer:
63.6% of softwood fibers
36.4% of regenerated cellulose fibers
corresponds to: 9.0 g/m$^2$ Total weight of sample 2: 16.4 g/m$^2$
Seal Seam Strength in Longitudinal Direction:
2.0 N/15 mm
Seal Seam Strength in Transverse Direction:
1.5 N/15 mm
The paper machine speed was 290 m/min for sample 1 and sample 2.

This test confirms once more that addition of an adhesion promoter improves seal seam strength (sample 1).

A microscopic examination of the sealed and subsequently broken 15 mm wide strip of sample 1 (see Brugger method of measurement) showed surprisingly that it was not the sealed polymer layer which came apart, as was the case with sample 2 without adhesion promoter, but rather the paper that had broken.

This is again a confirmation that the use of an adhesion promoter distinctly improves the seal seam strength of filter materials according to the present invention.

Although the present invention has been described in detail for the purpose of illustration, it is to be understood that such detail is solely for that purpose and that variations can be made therein by those in the art without departing form the spirit and scope of the invention.

What is claimed is:

1. A filter material comprising:
   at least one nonheatsealable ply comprising natural fibers and having a DIN ISO 9237 air permeability from about 300 to about 4,000 l/m$^2$·s; and
   at least one heatsealable ply consisting of natural fibers and synthetic fibers, wherein each of said synthetic fibers consists of a fiber blend of a synthetic material and an adhesion promoter, wherein said adhesion promoter of said fiber blend consists of polypropylene grafted with functional maleic anhydride groups.

2. The filter material according to claim 1, wherein the adhesion promoter is present in the filter material in an amount from about 2 to about 25% by weight, based on the weight of the at least one heatsealable ply.

3. The filter material according to claim 2, wherein the synthetic material is selected from the group consisting of polypropylene, polyethylene, vinyl chloride-vinyl acetate copolymer and polyester.

4. The filter material according to claim 3, wherein the at least one nonheatsealable ply consists of natural fibers and is constructed to have wet strength.

5. The filter material according to claim 4, wherein the at least one nonheatsealable ply has a basis weight between about 8 and about 40 g/m$^2$.

6. The filter material according to claim 5, wherein the at least one heatsealable ply has a basis weight from about 1 to about 15 g/m$^2$.

7. A method for manufacturing tea bags, coffee bags, tea filters or coffee filters comprising the step of forming tea bags, coffee bags, tea filters or coffee filters using the filter material of claim 1.

* * * * *